(12) United States Patent
Jones, II et al.

(10) Patent No.: US 9,641,920 B1
(45) Date of Patent: May 2, 2017

(54) SUPPORT STRUCTURES FOR COMPUTING DEVICES

(71) Applicant: Amazon Technologies, Inc., Reno, NV (US)

(72) Inventors: Alfred Charles Jones, II, San Jose, CA (US); Kelly Erin Johnson, Menlo Park, CA (US); Bhargav Prasad Rajaraman, Santa Clara, CA (US); Andrea Cloutier, Campbell, CA (US); Angel Wilfredo Martinez, Aptos, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 24 days.

(21) Appl. No.: 14/502,839

(22) Filed: Sep. 30, 2014

(51) Int. Cl.
*H04R 1/02* (2006.01)
*H04R 5/02* (2006.01)
*H04M 1/03* (2006.01)

(52) U.S. Cl.
CPC ............... *H04R 1/02* (2013.01); *H04M 1/03* (2013.01); *H04R 1/021* (2013.01); *H04R 1/025* (2013.01); *H04R 5/02* (2013.01); *H04R 2499/11* (2013.01); *H04R 2499/15* (2013.01)

(58) Field of Classification Search
CPC .......... H04R 1/02; H04R 1/021; H04R 1/025; H04R 5/02; H04R 2205/022; H04R 2205/024; H04R 2499/11; H04R 2499/15; H04M 1/03; H04M 1/026

USPC ....... 381/300, 306, 332, 333, 334, 386, 388, 381/394, 395; 361/679.23, 679.26, 361/679.55; 200/5 A, 294, 516; 455/575.1
See application file for complete search history.

(56) References Cited

U.S. PATENT DOCUMENTS

| | | | | |
|---|---|---|---|---|
| 5,852,545 A * | 12/1998 | Pan-Ratzlaff | ......... | G06F 1/1601 361/679.23 |
| 7,902,474 B2 * | 3/2011 | Mittleman | ............. | H01H 13/79 200/5 A |
| 8,258,418 B2 * | 9/2012 | Chen | ....................... | B29C 65/52 200/302.1 |
| 2008/0291647 A1 * | 11/2008 | Hirota | ................... | H04M 1/026 361/752 |
| 2009/0304221 A1 * | 12/2009 | Lin | ........................ | H04R 1/021 381/386 |
| 2014/0216903 A1 * | 8/2014 | Malek | .................... | H01H 15/24 200/294 |

* cited by examiner

*Primary Examiner* — Huyen D Le
(74) *Attorney, Agent, or Firm* — Seyfarth Shaw LLP; Ilan N. Barzilay; Christopher A. Baxter (57) ABSTRACT

Embodiments of the subject technology provides novel approaches to providing structural components for mobile computing devices to meet structural and physical form factor requirements for such devices. More specifically, the subject technology describes examples of novel mid-frame structural components, opposing snap features, camera support housing with an integrated lens, and a flexible printed circuit design with a self aligning dome FPC to button configuration.

19 Claims, 10 Drawing Sheets

SUPPORT STRUCTURES FOR COMPUTING DEVICES

BACKGROUND

Mobile computing devices have evolved to include more functionality. For instance, a mobile computing device (e.g., smartphone, phablet, tablet, etc.) may provide voice and data communications functionality, as well as computing, imaging, and processing capabilities. A mobile computing device may support cellular communication over a cellular network and data communication over a wireless radio channel in an example.

In assembling a mobile computing device, various implementation choices are made to accommodate constraints in the amount of physical space that is provided for components. In some instances, certain design decisions are made for structural components that are configured to hold other components of the mobile computing device in order to reduce the size of the mobile computing device.

BRIEF DESCRIPTION OF THE DRAWINGS

Various embodiments in accordance with the present disclosure will be described with reference to the drawings, in which.

DETAILED DESCRIPTION

Systems and apparatuses in accordance with various embodiments of the subject technology may overcome one or more deficiencies experienced in existing approaches to providing structural support to a mobile computing device. More specifically, embodiments described herein provide implementations for maintaining or increasing the structural integrity for a computing device while reducing an amount of physical space required for components of the computing device.

Mobile computing devices are prevalent throughout the world and provide copious amounts of computing power that have been packaged in increasingly smaller physical profiles. Shrinking electronic components are a major reason why the space necessary to house the electronic components (e.g., to enable such complex devices to operate) is decreasing over time. As the push for smaller physical profiles for such mobile computing devices continues, structural considerations are increasingly important not only to ensure strength and physical integrity of these devices but also to assist in diminishing their physical profiles. With smaller physical profiles, additional integration of components, physical configuration of structural feature and/or the respective arrangement and positioning of such throughout a given device have become increasingly important.

In supporting a wide range of features ranging from establishing phone calls, live streaming of music and/or videos, and/or image/video capturing, mobile computing devices are also desired to have an industrial design with the smallest form factor as possible. However, incorporating such state of the art features into a given computing device poses a challenge as an increasing number of components may be needed. In particular, more features are often required to be incorporated into a computing device without adding redundant costs or increasing the size of the device.

To provide more features to mobile computing devices, in some examples, thinner materials may be used to assemble a given mobile computing device. Thinner materials, however, may decrease flexural and/or torsional rigidity in the mobile computing device. Additionally, a mobile computing device may include several components that are stacked in a serial manner in a package (e.g., a camera stacked with a printed circuit board (PCB) and a chassis or cover plate). Stacking of components in a serial manner may, however, increase the thickness of the mobile computing device. Additionally, in some mobile computing devices, mid-frame structural supports are used to provide some additional rigidity to a device. However, the use of thinner materials to decrease the physical profile of a device may be offset by a structural support element that might be required in the device. The subject technology, in some embodiments, therefore provides novel approaches to meet structural requirements of a mobile computing device while also decreasing a physical device profile of the mobile computing device.

Although a mobile computing device (e.g., a smart phone, an electronic book reader, or tablet computer) is mentioned, it should be understood that various other types of electronic devices that are capable of determining and processing input can be used in accordance with various embodiments discussed herein. These devices can include (but are not limited to), for example, notebook computers, personal data assistants, video gaming consoles or controllers, portable media players, and wearable computers (e.g., smart watches, smart glasses, etc.) among others.

Figure 1A:
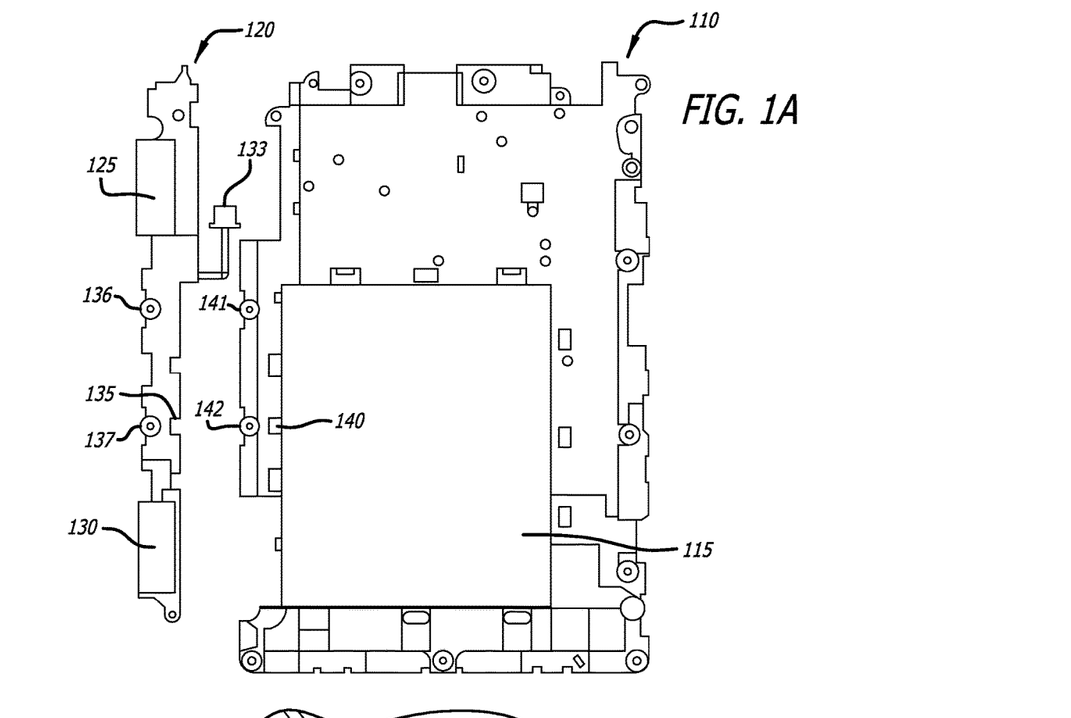
FIG. 1A illustrates a front view of an example apparatus for providing a mid-frame support structure with integrated speaker boxes.

FIG. 1A conceptually illustrates a front view of an example apparatus for providing a mid-frame support structure with integrated speaker boxes, which may be included as components of a mobile computing device. The apparatus includes a mid-frame support structure 110 and a molded speaker box support structure 120 including an insert-molded speaker 125 and an insert-molded speaker 130. The apparatus shown in FIG. 1A may be included as part of a given computing device, such as a mobile computing device with audio and/or camera capabilities among other types of features.

As shown in FIG. 1A, the mid-frame support structure 110 may, in at least one embodiment, be a magnesium mid-frame or made from another type of material such as other types of metal (e.g., aluminum, titanium, etc.), alloys (e.g., aluminum alloy), or plastics (e.g., polycarbonate). The molded speaker box support structure 120 may include a hollow plastic housing in which a speaker may be fitted into the plastic housing. In at least one embodiment, the insert-molded speakers 125 and 130 may each be fitted in such a hollow plastic housing (e.g., a single hollow plastic housing) at different positions. Alternatively, in another embodiment, the molded speaker box support structure 120 may include a first molded speaker box having a first hollow cavity, the first hollow cavity configured to seat at least a first insert-molded speaker driver disposed within the first hollow cavity (e.g., at the thicker end of the support structure 120), and a second molded speaker box disposed within the remaining structural portion (e.g., the thinner portion of the support structure 120) in which the second molded speaker box has a second hollow cavity that is configured to seat at least a second insert-molded speaker driver disposed within the second hollow cavity. The molded speaker box support structure 120 may further include an connector component 133 for receiving an audio signal that is provided to each speaker driver for output in at least one embodiment. The connector component 133 may, in one example, be connected to a main PCB board with other components of the computing device (e.g., a digital-to-analog converter). As further shown in FIG. 1, the mid-frame support structure 110 includes a battery support structure 115 to hold a battery (e.g., lithium-ion). In at least one embodiment, the battery support structure 115 may include side members that extend outward from a plane of the mid-frame support structure 110 to secure the battery to the battery support structure 115.

As illustrated in the example of FIG. 1A, the mid-frame support structure 110 includes a first side (e.g., left-hand side), a second side, a third side, and a fourth side in which the first side may be opposite to the third side and the second side may be opposite the fourth side, where the first, the second, the third, and the fourth sides together form a substantially rectangular shape. The mid-frame support structure 110 also includes an interlocking feature 140 disposed along the first side and extending substantially perpendicular the mid-frame support structure 110. The molded speaker box support structure 120 may include an interlocking feature 135 that mechanically couples with an interlocking feature 140 provided by the mid-frame support structure 110. In at least one embodiment, the interlocking feature 140 may include a flange or "tongue" (e.g., a "male" interlocking feature) affixed to or disposed along a portion (e.g., a side) of the mid-frame support structure. In at least one embodiment, the interlocking feature 135 may include a narrow cut or depression or "groove" (e.g., a "female" interlocking feature) in which the aforementioned flange of the interlocking feature 140 may be fitted into to form an interlocking joint. This enables the molded speaker box support structure 120 to mechanically fasten with the mid-frame support structure 110 in which the molded speaker box support structure 120 is disposed substantially parallel to the mid-frame support structure 110. Although a magnesium mid-frame may be provided in one example as mentioned before, it is appreciated that other types of materials (e.g., steel, aluminum, other metals or alloys, composites, plastics, ceramics, etc.) are contemplated herein for providing a mid-frame structure in accordance with the subject technology. As further shown, the molded speaker box support structure 120 includes screw boxes 136 and 137, and the mid-frame support structure 110 includes screw boxes 141 and 142. When the molded speaker box support structure 120 is coupled with mid-frame support structure (e.g., via the interlocking features 135 and 140 in an example) to form a "complete" mid-frame structure, the screw boxes 136 and 141 and the screw boxes 137 and 142, respectively, may be substantially aligned on top of each other.

Figure 1B:
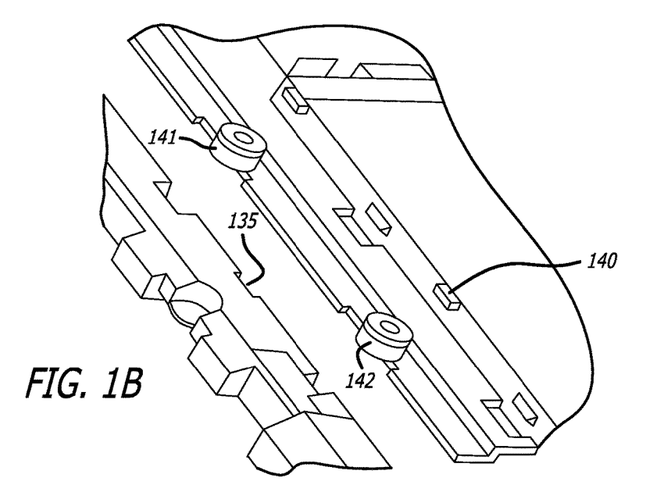
FIG. 1B illustrates a view of portions of the magnesium mid-frame and the speaker box support structure as shown in FIG. 1A.
Figure 1C:
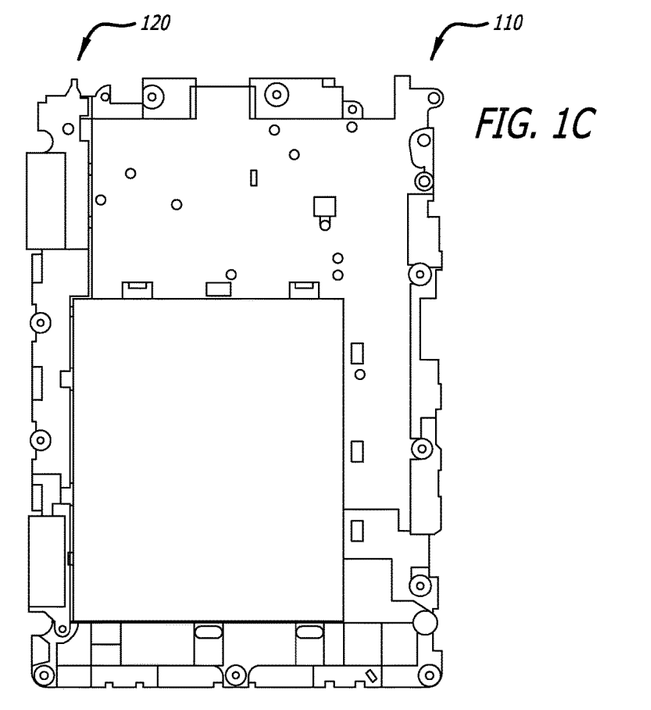
FIG. 1C illustrates a complete mid-frame structure with an integrated speaker box with dual speaker drivers.

FIG. 1B illustrates a view of portions of the magnesium mid-frame 115 and the molded speaker box support structure 120 as shown in FIG. 1A. As shown, the interlocking feature 135 (e.g., corresponding to the "female" interlocking feature 135 of FIG. 1A) may be coupled to the interlocking feature 140 (e.g., corresponding to the "male" interlocking feature 140 of FIG. 1A) to enable the molded speaker box support structure 120 and the magnesium mid-frame 115 to fasten to each other, without the need for screws or adhesive compounds, as illustrated in the example of FIG. 1C that illustrates a complete mid-frame structure with an integrated speaker box with dual speaker drivers. The aforementioned interlocking features may be positioned at various places on the magnesium mid-frame 115 and the molded speaker box support structure 120 in order to provide rigidity and strength to the complete mid-frame structure. In one example, a load (e.g., force applied to a structure) may be transferred through each of the interlocking features with little compromise to the torsion rigidity and bending resistance of the complete mid-frame structure.

Figure 1D:
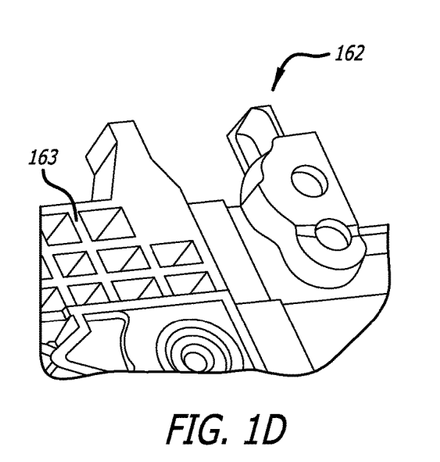
FIG. 1D illustrates an example detailed view of a portion of the speaker box support structure and a portion of the mid-frame support structure to show the connection between the upper left-hand corner of the example apparatus shown in FIG. 1C.
Figure 1E:
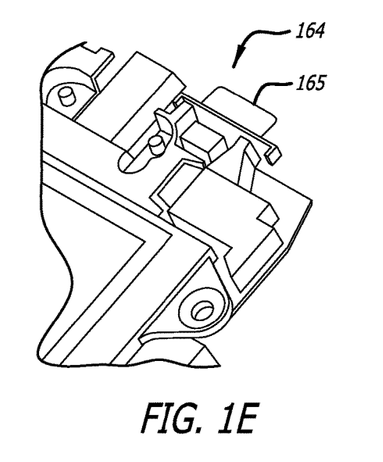
FIG. 1E illustrates a back side of the portion of the speaker box support structure and a portion of the mid-frame support structure to show the connection between the upper left-hand corner of the example apparatus shown in FIG. 1C.
Figure 1F:
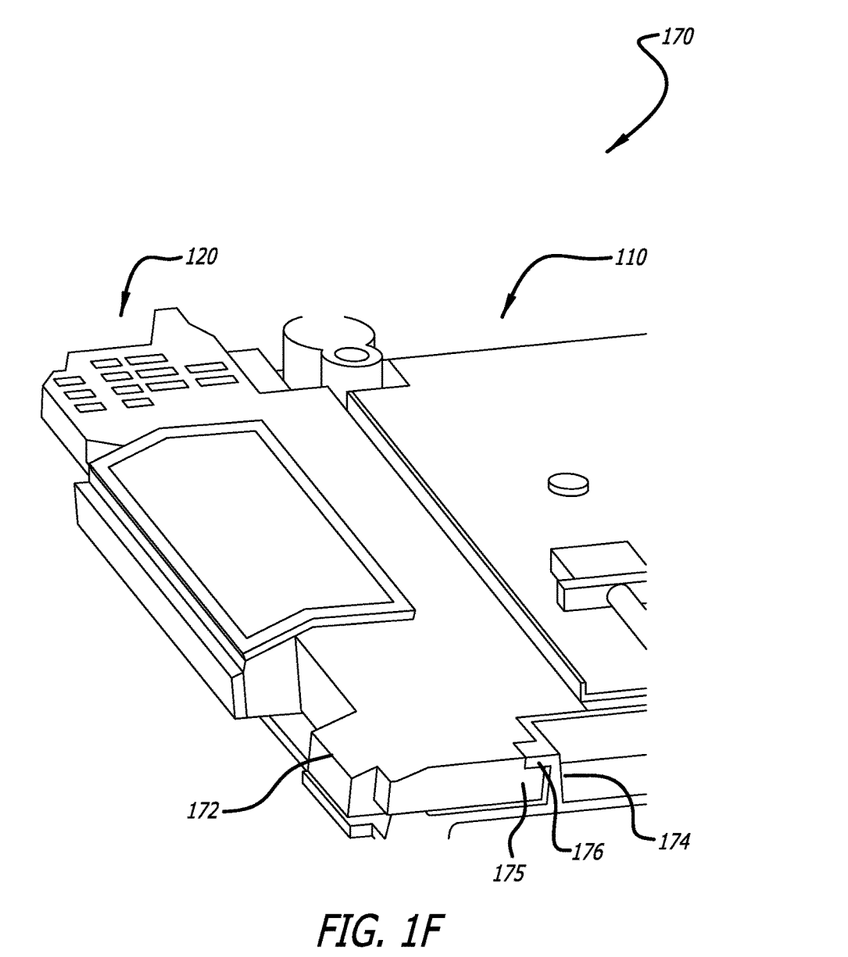
FIG. 1F illustrates a view of an interlock joint between the speaker box support structure and the mid-frame support structure that may be included as component of a mobile computing device.

FIG. 1D illustrates an example detailed view 162 of a portion of the molded speaker box support structure 120 and a portion of the mid-frame support structure 110 to show the connection between the upper left-hand corner of the example apparatus shown in FIG. 1C. In the view of the portion of the molded speaker box support structure 120, a honeycomb-like structure 163 may be provided that increases the strength of the molded speaker support structure 120 while also decreasing its weight and/or mass. Similarly, FIG. 1E shows a back side view 164 of the portion of the molded speaker box support structure 120 and a portion of the mid-frame support structure 110 to show the connection between the upper left-hand corner of the example apparatus shown in FIG. 1C. A button 165 is illustrated in FIG. 1E that is included on the molded speaker support structure 120. FIG. 1F illustrates a partial cross-sectional view 170 of interlock joints 172 and 174 between the molded speaker box support structure 120 on the left-hand side and the mid-frame support structure 110 as shown on the right-hand side. The interlock joint 172 forms an outer ridge of the molded speaker support structure 120 furthest away from the mid-frame support structure 110. The interlock joint 174 includes, as shown, a male interlocking feature 176 (e.g., a "tongue" including a lip portion) on the mid-frame support structure 110 that is fitted into a female interlocking feature 175 (e.g., a "groove" including a depressed region) on the molded speaker support structure 120.

Although the above example describes a single interlocking feature 140 disposed on the mid-frame support structure 110, it is understood that the mid-frame support structure 110 may include multiple interlocking features that are located at different positions for mechanically coupling with complementary interlocking features provided by the molded speaker box support structure 120.

Figure 2A:
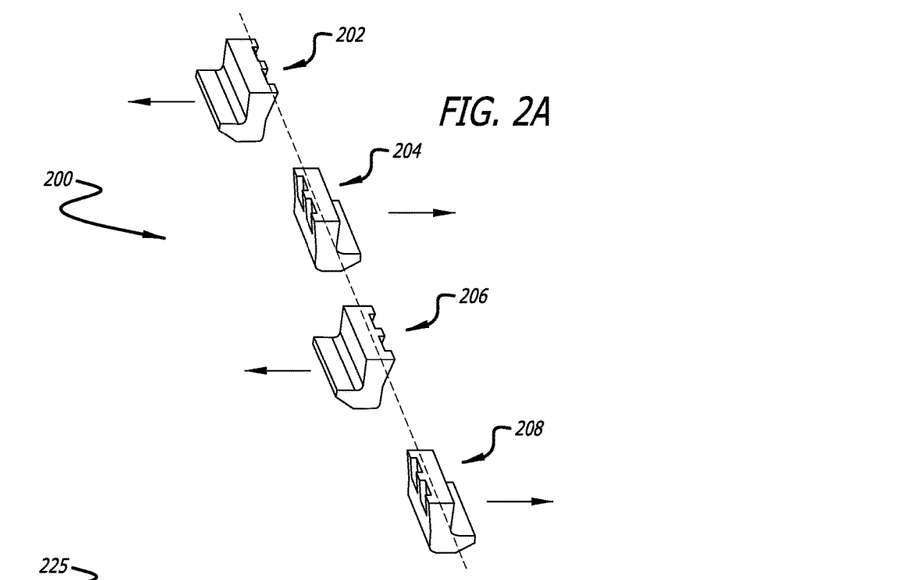
FIG. 2A illustrates a view of opposing housing snaps that provide locks in multiple housings with opposing snap directions.
Figure 2B:
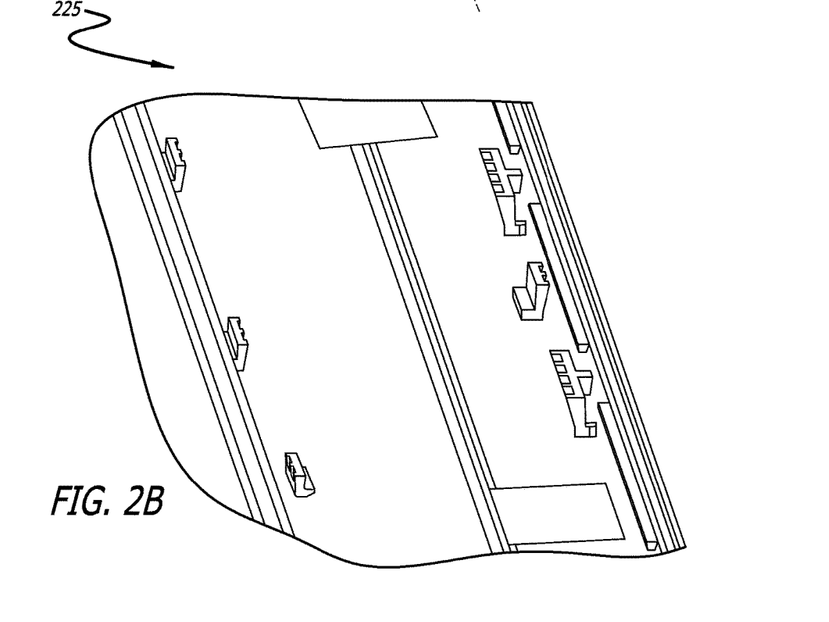
FIG. 2B illustrates an arrangement of opposing housing snaps to join a rear cover of a computing device to a front housing and a mid-frame structural components of the computing device.

FIG. 2A shows a view 200 of opposing housing snaps (e.g., "snap" features) in opposing directions that are disposed on a back or rear cover of a computing device and mate with complementary features on the mid-frame support structure 110. As illustrated, housing snap 202, 204, 206 and 208 may be aligned in a single line (e.g., a "zip line") with alternating snap directions to form the aforementioned opposing housing snaps. Each housing snap may be configured as illustrated in FIG. 2A which includes a structure having an upper region with one or more ridges and a lower lip region that extends in a respective snap direction (e.g., as indicated by an arrow). When a load is transferred along the zip line, the alternative positions of the housing snaps distributes the load in a manner where removal of a housing connected to the housing snaps is near impossible or difficult. In this manner, the housing snaps may lock in multiple housings and/or respective part(s) with opposing snap directions from each housing snap to another housing snap. The position of each housing snap in FIG. 2A may be substantially near a perimeter of a housing of a computing device as illustrated in a view 225 of the rear cover in the example of FIG. 2B to join to a front housing(s) and the mid-frame support structure 110 of the computing device.

Figure 2C:
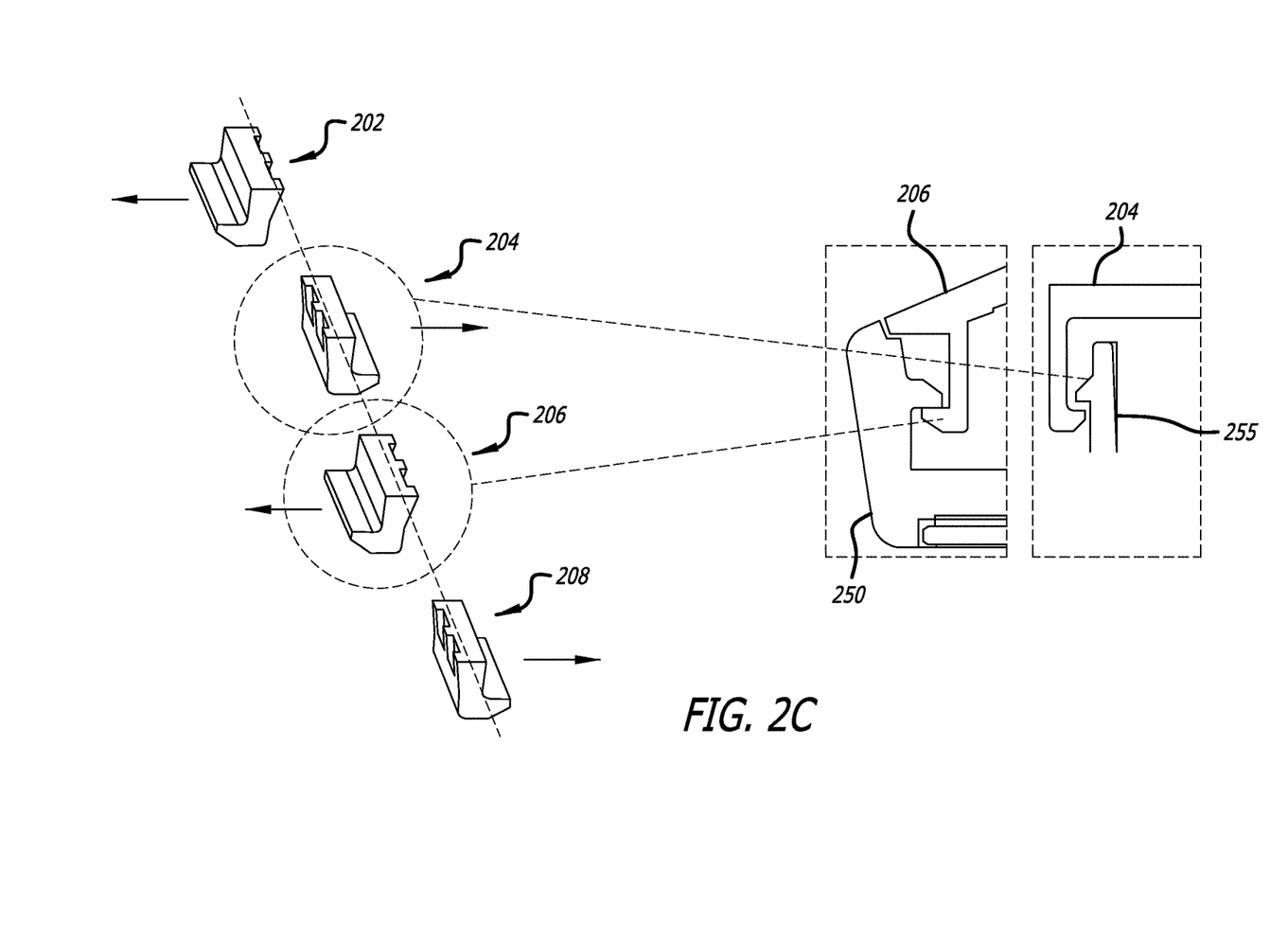
FIG. 2C shows a separate side profile view of two opposing housing snaps that were first shown in FIG. 2A.

FIG. 2C shows a separate side profile view of two opposing housing snaps that were first shown in FIG. 2A. FIG. 2C illustrates the same housing snaps that were shown in FIG. 2A. As illustrated, the housing snap 206 is arranged in a first snapping direction and interlocked with a front housing 250 of a computing device. The housing snap 204 is arranged in a second snapping direction (e.g., in an opposite direction along the same axis as the first snapping direction) that is opposed to the first snapping direction. The housing snap 204 is interlocked with a snap feature 255 including a flange or notch that is part of the mid-frame support structure 110 of the mobile computing device as shown. In some embodiments, each of the housing snaps may fall within a range of 4 mm to 5 mm in length. Through using such housing snaps in the opposing arrangement shown in above examples, a same amount of space may be used for securing the housing of the mobile computing device while improving the reliability and structural rigidity of the device. In particular, arranging the housing snaps in alternating directions may prevent a mechanical wave propagation when forces are applied in a direction that could potentially compromise (e.g., strip or loosen or break) the housing snaps.

Figure 2D:
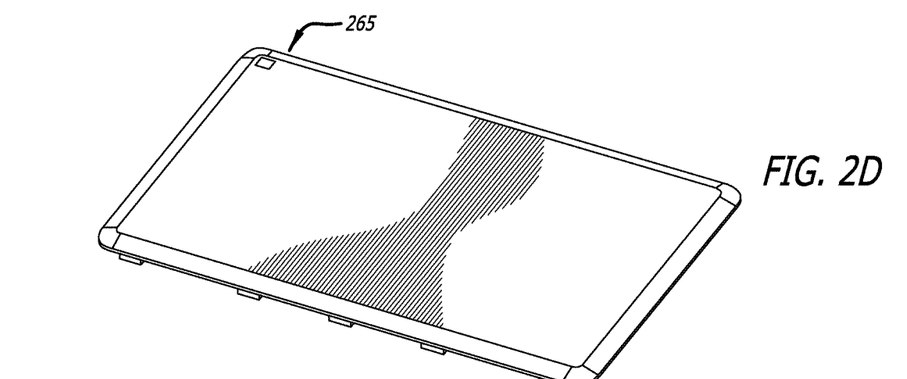
FIGS. 2D and 2E illustrates a two different views of a rear cover of a computing device including housing snaps.
Figure 2E:
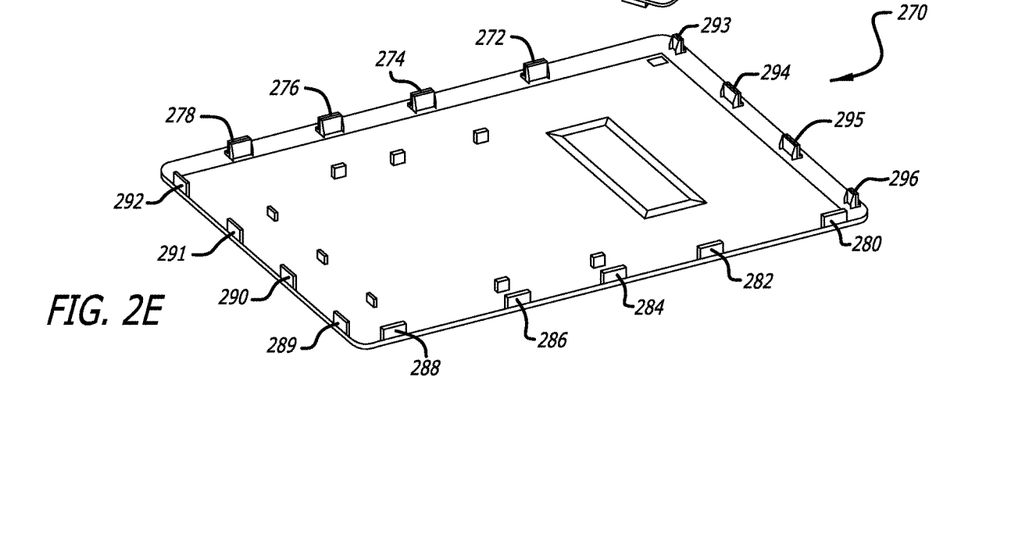

FIGS. 2D and 2E illustrates a two different views of a rear cover of a computing device including housing snaps. As shown in FIG. 2D, a first side of a rear cover 265 may be included as part of the computing device to serve as a protective shell to the mid-frame support structure 110 described before. In FIG. 2E, a opposite side of the rear cover 265 showing an inner surface 270 that includes housing snaps 272, 274, 276, and 278 along a first edge of the rear cover 265. Housing snaps 280, 282, 284, 286, and 288 are included along a second edge (e.g., opposite from the first edge) of the rear cover 265. Further, housing snaps 289, 290, 291, and 292 are included along a third edge of the rear cover 265, and housing snaps 293, 294, 295, and 296 are included along a fourth edge of the rear cover 265 (e.g., opposite from the third edge). As shown, each of the housing snaps in FIG. 2E extends perpendicular to a plane of the inner surface 270 of the rear cover 265. The positioning of each of the housing snaps on the rear cover 265 enables these snaps illustrated in FIG. 2E to mate with complementary features provided by the mid-frame support structure 110 described before. In an embodiment, the mid-frame support structure 110 is seated on the inner surface 270 of the rear cover 265.

Figure 3A:
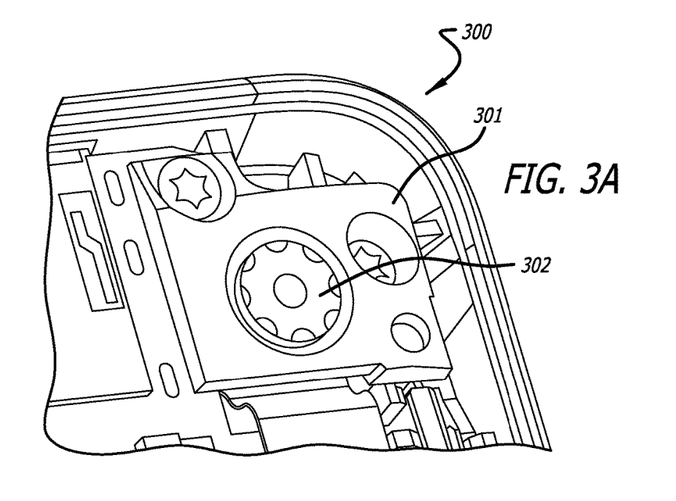
FIG. 3A illustrates a view of an example protective camera alignment support housing with a camera sans a cosmetic lens cover.

FIG. 3A illustrates a view 300 of an example protective camera alignment support housing 301 including a camera sans a cosmetic lens cover. The example of FIG. 3A shows a portion of the protective camera alignment support housing 301 as configured in a portion of a mobile computing device in which a lens element 302 of the camera is positioned in a corner of a cover of the mobile computing device. More specifically, the protective camera alignment support housing 301 is aligned with a first inner edge and a second inner edge of a cover of the mobile computing device. The protective camera alignment support housing 301 may be secured to another portion of the computing device (e.g., a PCB) by using screws, bolts, or another similar type of fastening device(s). However, it is appreciated that the support housing 301 may be secured to the corner of the computing device without requiring the use of such a fastening device(s). Further, the lens element 302 may be part of a larger camera module, including electrical components for enabling camera functionality, as further described below.

Figure 3B:
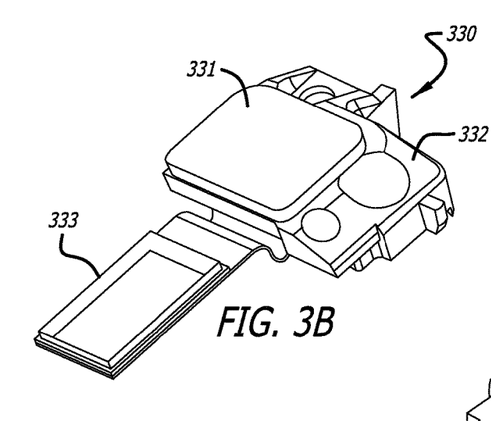
FIG. 3B illustrates a view of a camera module including a protective camera alignment support housing and the camera.

FIG. 3B illustrates a front view 330 of a camera module including a protective camera alignment support housing 332 and the camera with a "cosmetic" lens cover element 331, which is a thin material (e.g., hard transparent plastic) that protrudes on the outside of the computing device and protects and covers the lens element (e.g., made of glass). In this example, the lens cover element 331 is placed on top of the lens element 302 as described in FIG. 3A, and a connector support portion 333 attached to the camera module 330. The camera module 330 enables the camera to be supported and protected without having a structural device housing that may increase the thickness of the computing device. The camera module 330 therefore may be inserted into any suitable computing device and the lens element and rest of the camera (e.g., sensor, etc.) may be calibrated to fit within the computing device. Thus, by using the protective camera alignment support housing 332, device level testing may be avoided for fine tuning the camera (e.g., testing for being within tolerances) since the lens and alignment is built into the camera module 330. As a result, the reliability of the camera in the computing device may be improved due to at least the protection and alignment provided by the housing. In an example, an amount of tilt between the lens element and the camera (e.g., a CCD sensor placed behind the lens element) may be fine-tuned or controlled based on the alignment of the lens element as provided in the structure of the protective camera support housing 332. Consequently, a quality or reliability of the camera (e.g., the lens element is within accepted tolerances so that the tilt does not cause unwanted optical artifacts) may be determined before being tested at a later stage of assembling the computing device (e.g., when the entire device is assembled or when more components are assembled together).

Figure 3C:
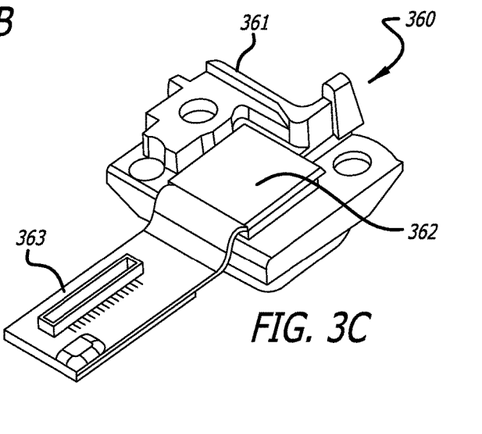
FIG. 3C illustrates a view of a camera module which shows a back side of the camera module shown previously in FIG. 3B.

FIG. 3C illustrates a back view 360 of a camera module 362 which corresponds to a back side of the camera module 330 as shown in FIG. 3B. Similarly, FIG. 3C includes a protective camera alignment support housing 361 and a back side 362 of the camera. As illustrated, the protective camera alignment support housing 361 includes a L-shaped or angled structure that enables placement at a corner of the computing device as illustrated in FIG. 3A. A ribbon connector element 363 is coupled to a back side of the connector support portion 333 described in FIG. 3B. In at least one embodiment, the ribbon connector element 363 may be coupled to another portion of the computing device, such as a main PCB board to further enable camera functionality provided in part by the aforementioned camera module.

Figure 4A:
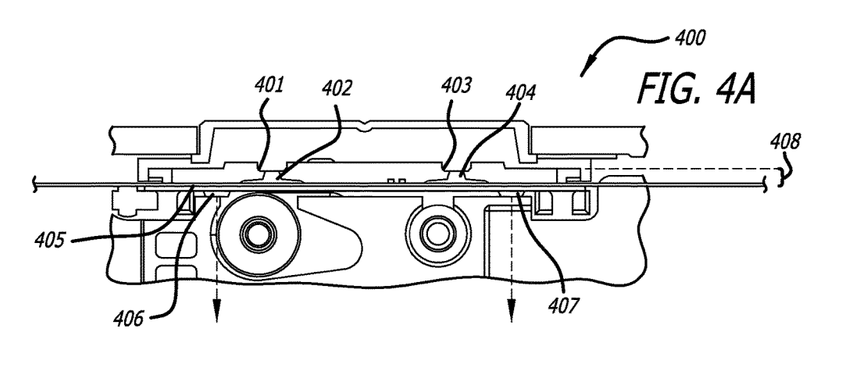
FIG. 4A illustrates a cross-sectional view of an apparatus including a switch assembly that includes a flexible printed circuit (FPC) with a self aligning dome switch to button configuration.

FIG. 4A illustrates a cross-sectional view of an apparatus 400 including a switch assembly that includes a flexible printed circuit (FPC) with a self aligning dome switch to button configuration. The apparatus 400, in at least one embodiment, may include components that are part of a mobile computing device. In particular, FIG. 4A illustrates a dome switch configuration that may align itself to the outer most part of a dome FPC slot in a housing. Shear assembly, in an example, involves assembling parts that may glide past each other during the assembly process, and/or placing a component or part in a slot. When assembling parts in shear, a gap of at least a distance to allow a given button and other parts of a computing device to avoid colliding with each other and not damaging such parts during assembly. Such a gap may decrease the tactility of the button, which is an undesired consequence of shear assembly. To reduce the distance of the gap and improve on the tactility of buttons 401 and 403, the example apparatus of FIG. 4A includes springs 406 and 407 that are adjacent to a FPC stiffener element 405 and placed into respective housing slots to allow for the FPC to be inserted while slowly closing the gap between a button and a dome switch on the FPC. The FPC may be a flexible polymer film made from a material(s) that includes polyester, polyimide (PI), polyethylene napthalate, polyetherimide, along with fluropolymers and copolymers polyimide films, among other different materials. The FPC stiffener element 405 may be made of a metal (e.g., steel, aluminum, alloy, etc.), plastic, or fiberglass. Each of the springs 406 and 407 may be coil shaped or helical shaped, or any other suitable shape for a spring and made from metal, such as steel, copper, alloy, etc.

As shown in FIG. 4A, the FPC stiffener element 405 is adjacent to the springs 406 and 407 as described before. Dome switches 402 and 404 are disposed on the FPC and affixed thereon (e.g., using an adhesive), and the FPC is then placed on the FPC stiffener element. 405. When one or more of the buttons 401 and 403 are depressed by a user by exerting force upon an outer portion of the mobile computing device which is transferred to the corresponding dome switches 402 and 404, the springs 406 and 407 may be pushed in a direction as indicated by the arrows in FIG. 4A.

A gap 408 represents a distance between the dome switches 402 and 404 and the buttons 401 and 403. The springs 406 and 407, as further illustrated, may be disposed at an offset, respectively, from the dome switches 402 and 404. In an example, the dome switches 402 and 404 may be round or circular metal domes placed on a polyester sheet (e.g., the FPC) to provide a tactile response when the dome switch is actuated. In another example, the dome switches may be made from a polyester material or elastomer, or polyimide. The FPC is rigidly supported by the FPC stiffener element 405 and the FPC carries at least one pole of the dome switches for controlling a respective circuit (e.g., volume control).

Figures 4B, 4C:
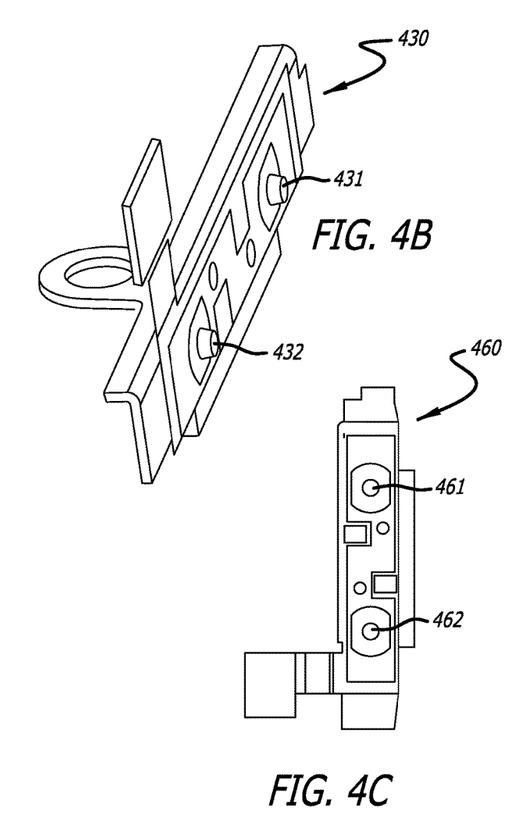
FIG. 4B conceptually illustrates a perspective view of the FPC with dome switches.
FIG. 4C illustrates a side view of a same FPC as illustrated in FIG. 4B including dome switches.
Figure 4D:
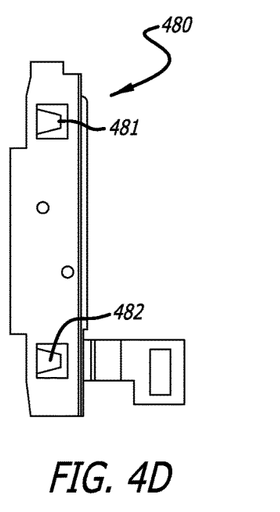
FIG. 4D illustrates an opposite side view of the same FPC as shown in FIG. 4B including springs.

FIG. 4B conceptually illustrates a perspective view of a flexible printed circuit 430 (FPC) with the dome switches 431 and 432. FIG. 4C illustrates a side view 460 of a same FPC as illustrated in FIG. 4B including dome switches 461 and 462. The dome switches 461 and 462 may correspond by reference to the dome switches 431 and 432 in FIG. 4B. FIG. 4D illustrates an opposite side view 480 of the same FPC as shown in FIG. 4B including springs 481 and 482 that are fitted into respective housing slots. As discussed before, by virtue of having the springs fitted into their respective housing slots, the springs 406 and 407 may at a position at an offset from the dome switches 461 and 462.

Figure 5:
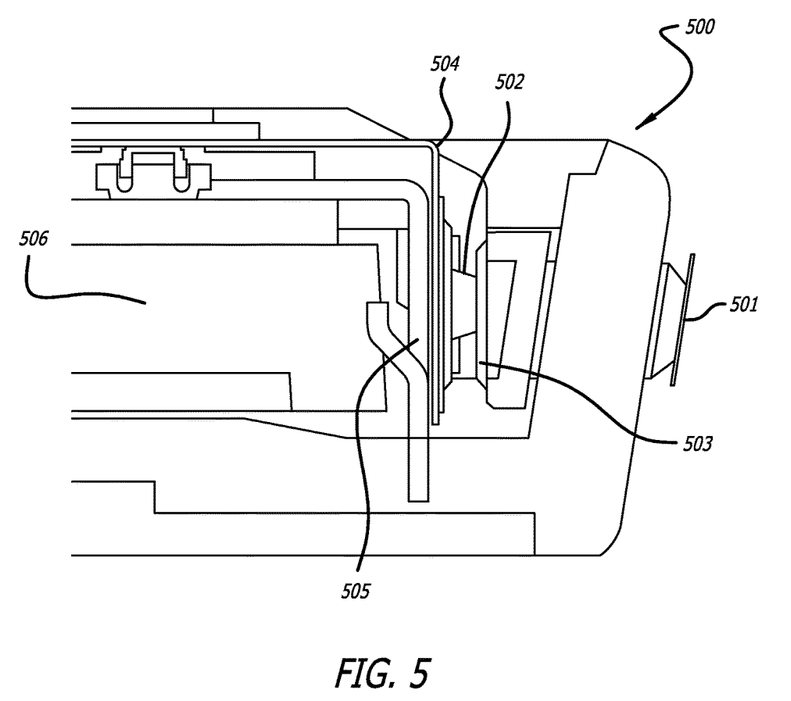
FIG. 5 illustrates a detailed cross sectional view of an apparatus including a switch assembly that includes a FPC with a dome switch which is arranged adjacent to a button.

FIG. 5 illustrates a detailed cross sectional view of an apparatus 500 including a switch assemble that includes a flexible printed circuit (FPC) 504 with a dome switch 502 which is arranged adjacent to an inner button 503. As further shown, an outer button 501 may be included on the exterior of the outside housing or casing of a mobile computing device. In an embodiment, when a user or person provides a force to actuate the outer button 501, the inner button 503 may be depressed which in turn engages the inner button to the dome switch 502 causing the dome switch to actuate. A mid-frame 506 and FPC stiffener 505 are also illustrated in FIG. 5. The dome switch 502, in at least one embodiment, is disposed and affixed on the FPC 504 (e.g., using an adhesive or similar compound) which is then placed on the FPC stiffener 505 that provides further rigidity and support to the FPC an dome switch 502. The FPC stiffener 505, as shown, is coupled to (at least a portion of) the mid-frame 506, and may in an embodiment include a housing slot in which a spring may be fitted into. (e.g., corresponding to one of the housing slots shown in FIG. 4D).

Figure 6:
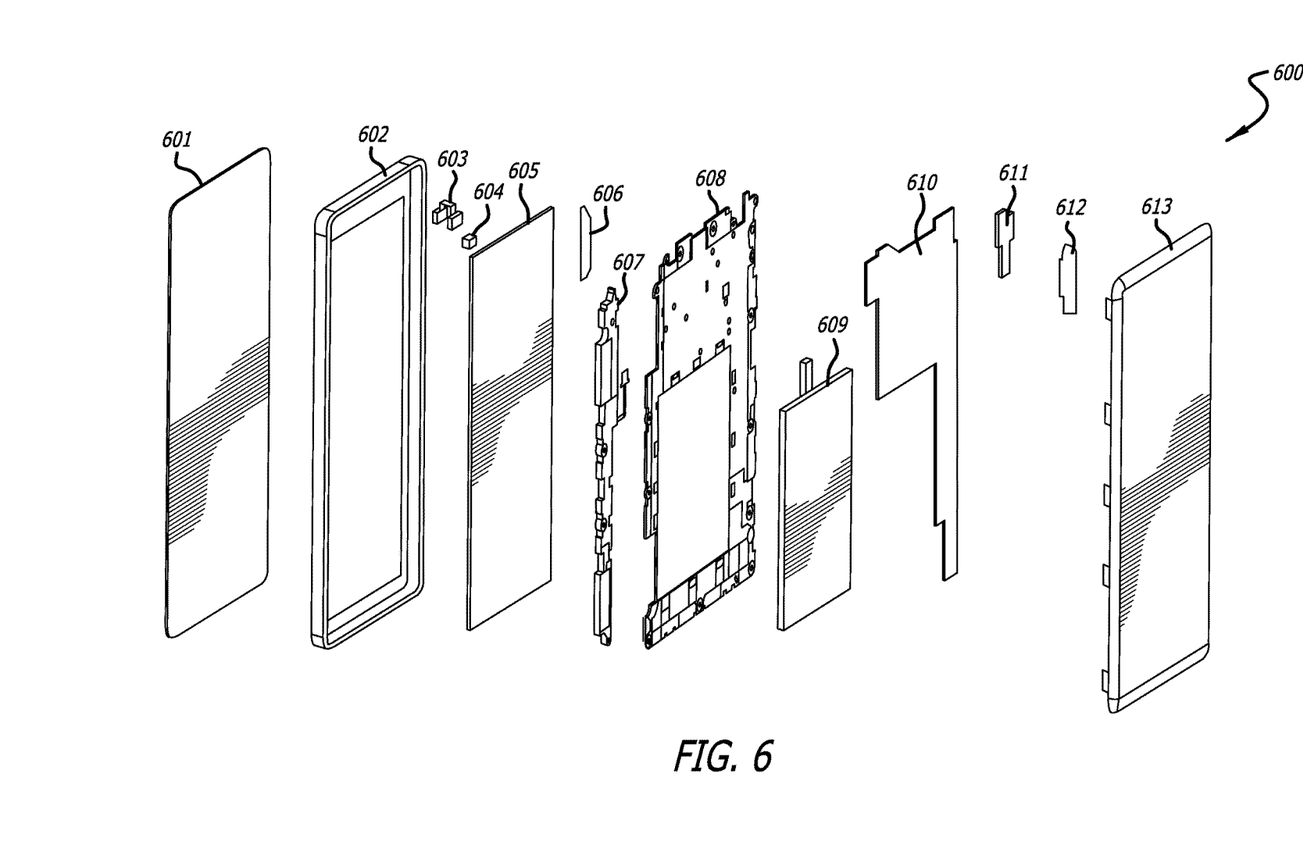
FIG. 6 illustrates an exploded view showing of an example apparatus in accordance with at least one embodiment of the subject technology.

FIG. 6 illustrates an exploded view showing of an example apparatus 600 in accordance with at least one embodiment of the subject technology. A touch panel assembly 601 may include a touch panel or sensor that accepts touch input from a user. Some examples may include a resistive touchscreen panel, capacitive touchscreen panel, or other appropriate touchscreen panel. Other components of the apparatus 600 include a front cover assembly 602, a front facing camera 603, a power button 604, a display module 605 (e.g., LCD, LED, OLED, etc.), a volume button 606, a speaker box structure 607, a mid-frame assembly 608, a battery 609, a printed circuit board 610 including electrical components of the apparatus 600 such as a processor, a rear facing camera 611, a volume flexible printed circuit 612 including button(s) for controlling an audio output volume, and a rear cover assembly 613. The speaker box structure 607 may correspond to the molded speaker box support structure described in FIGS. 1A, 1B, 1C, 1D and 1F. Similarly, the mid-frame assembly 608 may correspond to the mid-frame support structure described in FIGS. 1A, 1B, 1C, 1D and 1F. The volume flexible printed circuit 612 may correspond to the components described in FIGS. 4A, 4B, 4C, 4D and 5. The rear cover assembly may correspond to rear cover described in FIG. 2E. Further, the rear facing camera 611 may correspond to the camera module including a protective camera alignment support housing as described in FIGS. 3A, 3B, and 3C.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A mobile device comprising:
   a mid-frame support structure having a rectangular shape, the mid-frame support structure including a first interlocking feature disposed along a first side of the mid-frame support structure and extending substantially parallel from the mid-frame support structure, the mid-frame support structure being within the mobile device and behind a display of the mobile device;
   a speaker support structure including a first speaker, a second speaker, and a second interlocking feature disposed along a first side of the speaker support structure, the second interlocking feature configured to mechanically couple with the first interlocking feature to form a mid-frame structure;
   a rear cover of the mobile device including a surface, the mid-frame support structure abutting the surface; and
   a camera support housing configured to hold a camera, the camera support housing being aligned with a first inner edge of the rear cover and a second inner edge of the rear cover,
   wherein the speaker support structure is disposed substantially parallel to the mid-frame support structure.

2. The mobile device of claim 1, wherein:
   the first speaker comprises a first molded speaker box, the first molded speaker box having a first hollow cavity, the first hollow cavity configured to seat at least a first insert-molded speaker driver disposed within the first hollow cavity; and
   the second speaker comprises a second molded speaker box, the second molded speaker box having a second hollow cavity, the second hollow cavity configured to seat at least a second insert-molded speaker driver disposed within the second hollow cavity.

3. The mobile device of claim 1, wherein:
   the rear cover includes an inner surface having a first edge, the first edge including a set of opposing snap features that extend perpendicular to the inner surface, the opposing snap features configured to couple with a set of complementary features on the mid-frame support structure, the set of opposing snap features including at least a first snap feature oriented in a first direction and at least a second snap feature oriented in a second direction opposite to the first direction in a same axis that is parallel to a plane of the inner surface.

4. A mobile computing device comprising:
   a mid-frame support structure including a first interlocking feature, the mid-frame support structure being within the mobile computing device and behind a display of the mobile computing device;
   a speaker support structure including a second interlocking feature, the speaker support structure configured to attach to the mid-frame support structure by engaging the second interlocking feature to the first interlocking feature, the speaker support structure including at least one speaker driver disposed substantially at a first end of the speaker support structure;
   a rear cover of the mobile computing device including a surface, the mid-frame support structure abutting the surface; and
   a camera support housing configured to hold a camera, the camera support housing being aligned with a first inner edge of the rear cover and a second inner edge of the rear cover.

5. The mobile computing device of claim 4, wherein the mid-frame support structure further includes a side member, the side member including the first interlocking feature extending substantially parallel from the side member, the side member extending parallel with a plane of the mid-frame support structure.

6. The mobile computing device of claim 5, wherein
   the second interlocking feature is disposed substantially parallel to a side of the speaker support structure, the second interlocking feature configured to attach to the first interlocking feature of the mid-frame support structure to have the side of the speaker support structure disposed substantially parallel to the side member of the mid-frame support structure.

7. The mobile computing device of claim 4, further comprising:
   a first molded speaker box disposed at a first location of the speaker support structure, the first molded speaker box configured to seat a first speaker driver; and
   a second molded speaker box disposed at a second location of the speaker support structure, the second molded speaker box configured to seat a second speaker driver.

8. The mobile computing device of claim 4, further comprising:
   a set of opposing snap features substantially disposed on at least a first edge of the surface and extending perpendicular to the surface, the opposing snap features configured to mechanically couple with a set of complementary features on the mid-frame support structure.

9. The mobile computing device of claim 8, wherein the set of opposing snap features include at least a first snap and at least a second snap that are each oriented in opposite directions.

10. The mobile computing device of claim 4, wherein the camera comprises:
    a camera module coupled to the camera support housing, the camera module comprising:
    a lens cover disposed over a lens element; and
    a connector support portion, the connector support portion extending outward from the camera support housing.

11. The mobile computing device of claim 10, wherein the connector support portion further includes a connector interface mounted on the connector support portion.

12. The mobile computing device of claim 11, wherein the camera support housing is secured to the rear cover using a mechanical fastener.

13. The mobile computing device of claim 4, further comprising:
    a dome switch disposed on a flexible printed circuit (FPC), the FPC coupled to a stiffener element, the stiffener element coupled to the mid-frame support structure.

14. The mobile computing device of claim 4, further comprising a switch assembly, the switch assembly comprising:

a flexible printed circuit (FPC), the FPC comprising a first dome element disposed on a portion of the FPC;

a FPC stiffener element configured to support the FPC, the FPC being seated on at least a portion of the FPC stiffener element; and a button, the button being substantially aligned with the first dome element.

15. The mobile computing device of claim 14, wherein the FPC stiffener element is disposed on at least a portion of the mid-frame support structure.

16. The mobile computing device of claim 15, further comprising a spring, the spring being disposed in a housing slot provided by the FPC stiffener element, the housing slot being at an offset from the first dome element.

17. The mobile computing device of claim 16, wherein the spring moves in a direction substantially perpendicular to the FPC stiffener element in response to the button being depressed by a force that actuates the dome element.

18. The mobile computing device of claim 14, wherein a distance between the button and the first dome element comprises a value that has the button being substantially adjacent to the first dome element.

19. The mobile computing device of claim 14, further comprising:

an outer button disposed on a surface of an outer housing, the outer button configured to engage the button responsive to the outer button being depressed by a force that actuates the outer button.

* * * * *